(12) United States Patent
Umatt (10) Patent No.: US 8,351,935 B2
(45) Date of Patent: Jan. 8, 2013

(54) APPARATUS AND METHOD FOR USING MOTION SENSOR DATA TO SELECT FULL BAND SCANS

(75) Inventor: Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 917 days.

(21) Appl. No.: 12/434,932

(22) Filed: May 4, 2009

(65) Prior Publication Data

US 2010/0279637 A1 Nov. 4, 2010

(51) Int. Cl.
*H04B 1/18* (2006.01)
(52) U.S. Cl. .................. 455/434; 455/162.1
(58) Field of Classification Search .............. 455/434, 455/162.1
See application file for complete search history.

(56) References Cited

U.S. PATENT DOCUMENTS

| 8,107,955 B2 * | 1/2012 | Islam et al. ............ 455/434 |
| 2009/0036123 A1 * | 2/2009 | Jeon ...................... 455/434 |
| 2009/0156205 A1 | 6/2009 | Rowitch |
| 2010/0075670 A1 * | 3/2010 | Wu ....................... 455/434 |

FOREIGN PATENT DOCUMENTS

| EP | 1328087 | 7/2003 |
| GB | 2413737 | 11/2005 |
| WO | WO0019751 | 4/2000 |

OTHER PUBLICATIONS

International Search Report and Written Opinion—PCT/US2010/033630, International Search Authority—European Patent Office—Aug. 13, 2010.

\* cited by examiner

*Primary Examiner* — Joseph Chang
(74) *Attorney, Agent, or Firm* — Kevin T. Cheatham (57) ABSTRACT

An apparatus and method for determining whether to perform a full band scan by using motion sensor data comprising determining if a user equipment has been stationary since the full band scan was last performed; determining if the user equipment has skipped full band scans more times than a skipped threshold; and if the user equipment has skipped full band scans more times than the skipped threshold, performing a full band scan, or if the user equipment has not skipped full band scans more times than the skipped threshold, performing a partial band scan or performing no scan.

27 Claims, 8 Drawing Sheets

APPARATUS AND METHOD FOR USING MOTION SENSOR DATA TO SELECT FULL BAND SCANS

FIELD

This disclosure relates generally to apparatus and methods for wireless communication systems. More particularly, the disclosure relates to determining whether to perform full band scans by using motion sensor data.

BACKGROUND

Wireless communication systems provide a variety of communication services to mobile users that are away from the fixed telecommunications infrastructure or are moving. These wireless systems employ radio transmissions to interconnect mobile devices with various base stations in the service area. The base stations, in turn, are connected to mobile switching centers which route connections to and from the mobile devices to others on various communication networks such as the public switched telephony network (PSTN), Internet, etc. In this manner, users that are away from their fixed sites or are on the move may receive various communication services such as voice telephony, paging, messaging, email, data transfers, video, Web browsing, etc.

Due to the use of radio frequencies for wireless interconnection, all mobile users must agree on a common set of protocols to share the scarce radio spectrum allocated for wireless communication services. One important protocol relates to the access method used to connect multiple mobile devices to the wireless communication network. Various access methods include frequency division multiple access (FDMA), time division multiple access (TDMA), code division multiple access (CDMA), and orthogonal frequency division multiplex (OFDM).

During certain scenarios, user equipment (UE) needs to search the allocated frequency band on all supported radio access technologies (RAT) to find a channel to camp on. Depending on the algorithm used for channel scanning, a full scan may take several minutes to complete. In addition to the lengthy scan duration, a full scan may consume significant battery energy, thus decreasing the time until battery recharging must be performed. Techniques are desired to increase the UE battery life and decrease the channel scan duration.

SUMMARY

Disclosed is an apparatus and method for determining whether to perform full band scans by using motion sensor data. According to one aspect, a method for determining whether to perform a full band scan by using motion sensor data comprising determining if a user equipment (UE) has been stationary since the full band scan was last performed; determining if the user equipment (UE) has skipped full band scans more times than a skipped threshold; and if the user equipment (UE) has skipped full band scans more times than the skipped threshold, performing a full band scan, or if the user equipment (UE) has not skipped full band scans more times than the skipped threshold, performing a partial band scan or performing no scan.

According to another aspect, a user equipment comprising a processor and a memory, the memory containing program code executable by the processor for performing the following: determining if the user equipment has been stationary since the full band scan was last performed; determining if the user equipment has skipped full band scans more times than a skipped threshold; and if the user equipment has skipped full band scans more times than the skipped threshold, performing a full band scan, or if the user equipment has not skipped full band scans more times than the skipped threshold, performing a partial band scan or performing no scan.

According to another aspect, a computer-readable medium having a computer program comprising instructions, which when executed by at least one processor, operates to determine whether to perform a full band scan by using motion sensor data, the computer program comprising instructions for determining if a user equipment (UE) has been stationary since the full band scan was last performed; instructions for determining if the user equipment (UE) has skipped full band scans more times than a skipped threshold; instructions for performing a full band scan if the user equipment (UE) has skipped full band scans more times than the skipped threshold; and instructions for performing a partial band scan or no scan if the user equipment (UE) has not skipped full band scans more times than the skipped threshold.

Advantages of the present disclosure include increase battery life and decrease the channel scan duration.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
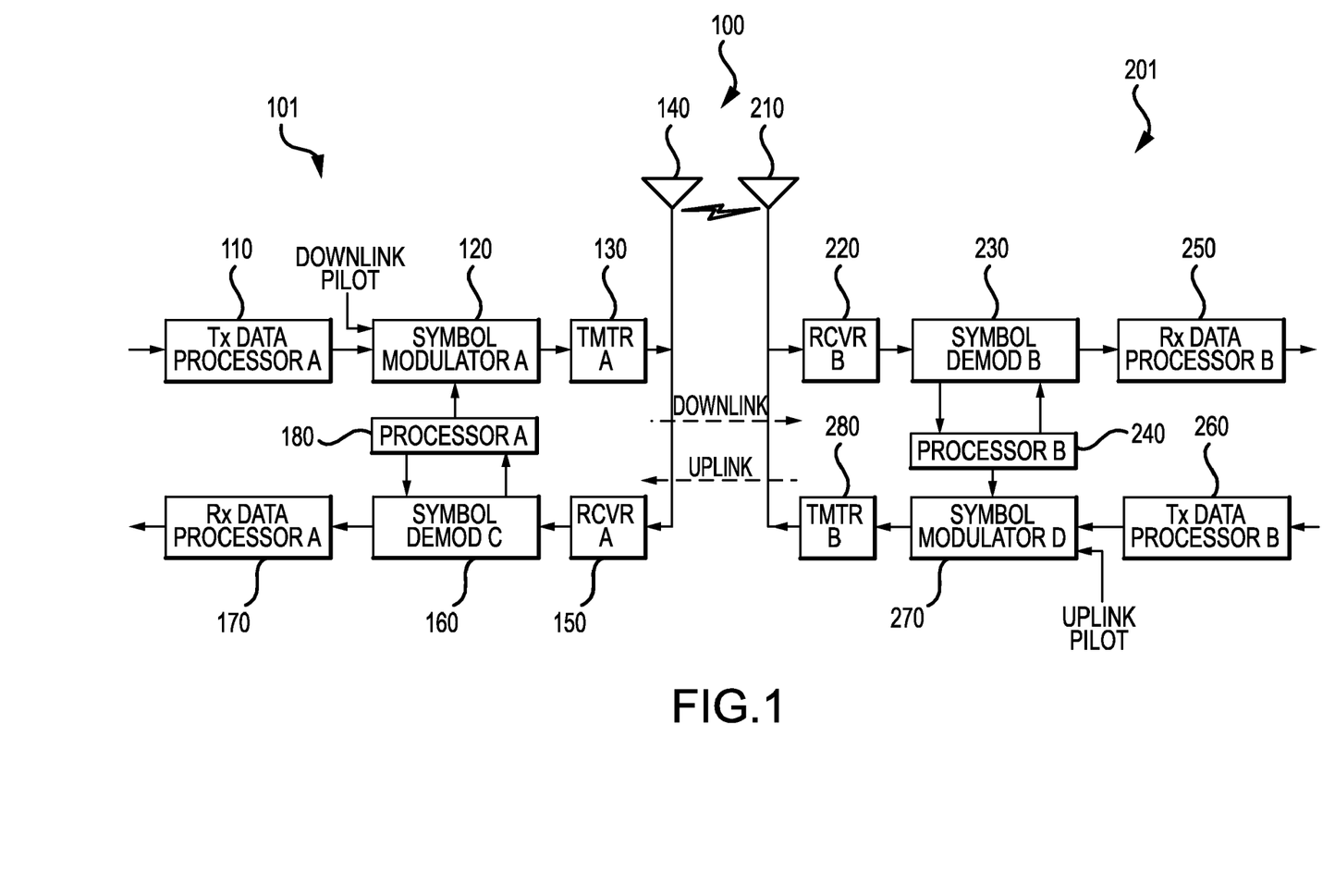
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
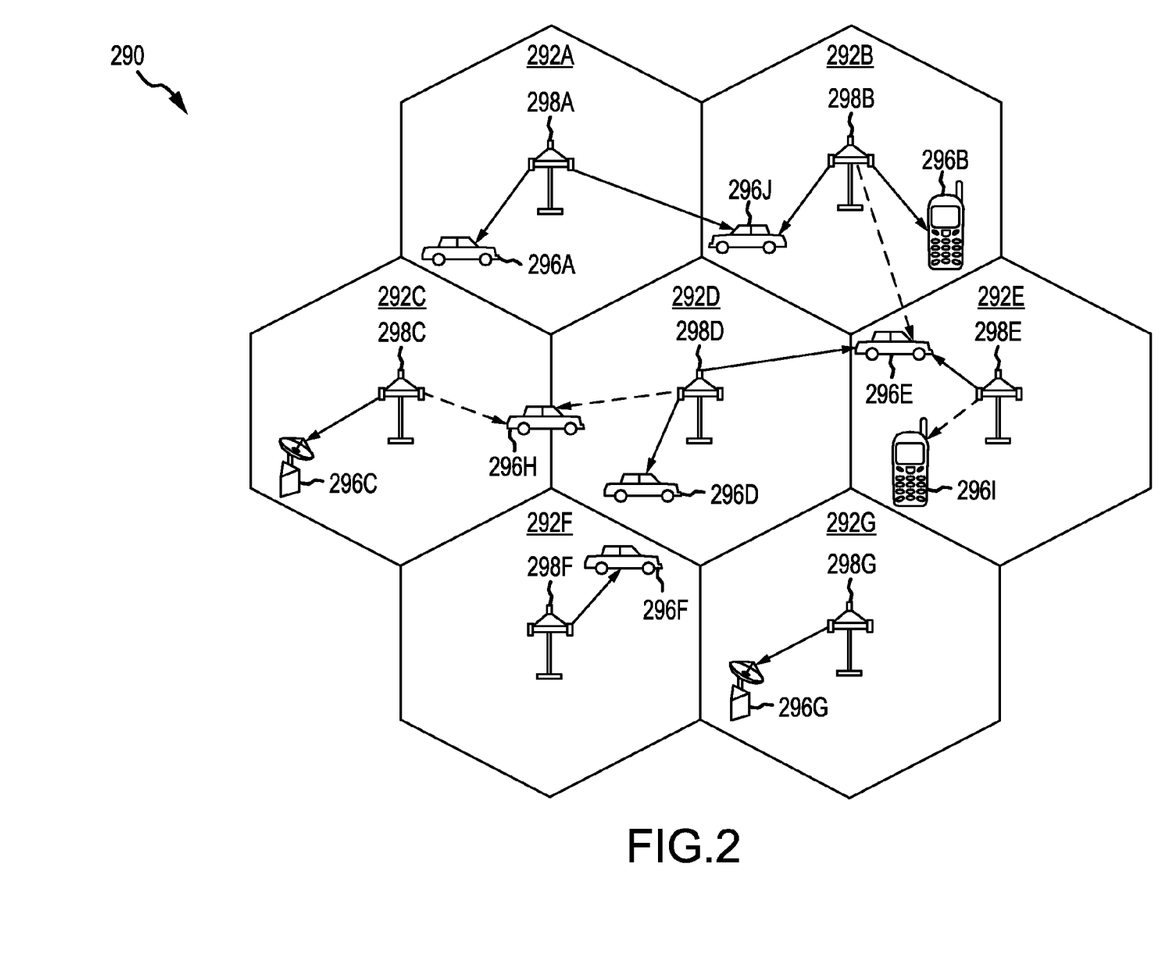
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively. Inter-system (i.e., inter-radio access technology (IRAT) transition) handover occurs when an ongoing call is transitioned between a cell of one network and a cell of another network. Such a transition may occur, for example, between a WCDMA site and a GSM site.

In typical wireless communication systems, the UE needs to acquire a suitable radio channel prior to call initiation or reception. Various radio channels are first scanned within a particular wireless network until a suitable radio channel is acquired and tracked. This process of acquiring and tracking onto a suitable control channel is known as "camping". In certain scenarios, the UE is required to scan the entire radio band or sets of radio bands on all the supported RATs. Examples of RATs are second generation systems such as Global System for Mobile communications (GSM), Enhanced Data rates for GSM Evolution (EDGE), IS95 Code Division Multiple Access (CDMA), etc. Other examples of RATs include next generation wireless systems such as Universal Mobile Telecommunications System (UMTS), CDMA2000, Evolution-Data Optimized (EVDO), Long Term Evolution (LTE), etc. In this case, the UE may need significant time and battery energy to perform the full band scans.

For example, in one version of UMTS, the frequency band allocation is 60 MHz in each direction which results in approximately 300 radio channels per system. With multiple systems, the UE may require several minutes to perform a full band scan. On the other hand, if the UE knows that it has been stationary since the last time a full band scan was performed, it could exploit this knowledge to perform only a partial band scan.

A partial band scan is a scan over less than a full band. In one example, the UE includes an acquisition database which lists the most frequently used channels which are scanned first in a partial band scan for a particular RAT. The partial band scan may stop if a suitable channel is found. If not, the UE expands beyond these channels until a suitable channel is found. Since most of the radio channels that are detectable by the UE at this time were also detectable the last time a full band scan was performed, there would be no performance compromise. This knowledge would improve battery standby time (i.e., maximize the period between battery recharging). In addition, since only a partial band scan is performed, the UE is able to complete the search more quickly, which is advantageous to the UE user.

In one aspect, the UE monitors the time a full band scan was last performed on a particular RAT and also monitors a motion sensor since the last full band scan. Examples of motion sensors include: infrared (IR) sensors, ultrasonic sensors, microwave sensors, accelerometers, etc. The UE also captures the results of the last full band scan in a database to facilitate a quick partial band scan if required at the next search trigger. In certain scenarios, for example, to provide detection of all radio channels when a new radio channel is occasionally deployed in the RAT, the UE still performs a full band scan, even if it is determined to be stationary. In one example, a counter is used to track the number of times the full band scan was skipped. The counter is compared against a counter threshold, and the comparison is used to decide to perform a full band scan or not. One skilled in the art would understand that the counter threshold can be set based on many factors such as application, battery life criteria, operational conditions, design constraints, user choices, etc. without affecting the scope and spirit of the present disclosure.

In one example, if the UE is determined to be stationary by the motion sensor, the counter threshold may be set to the equivalent of 30 minutes. More generally, the counter threshold is programmable and is set by operator choice. In one example, a full band scan may be performed every six minutes, which implies a total of 5 scans in a 30 minute period. In this case, the system could skip 5 full band scans if the UE is determined to be stationary.

In another example, if the UE is determined to be moving by the motion sensor, the counter threshold is set to a value less than that used for the stationary case, known as the counter stationary threshold. In one example, the counter threshold may be set by multiplying the counter stationary threshold by a factor less than one that is inversely proportional to the UE speed.

In one aspect, there are four situations where band scans are performed by the UE when certain events are triggered or in certain scenarios: (1) manual public land mobile network (PLMN) scan, (2) higher priority public land mobile network (PLMN) scan, (3) periodic full service scan, and (4) out of service scan.

Figure 3:
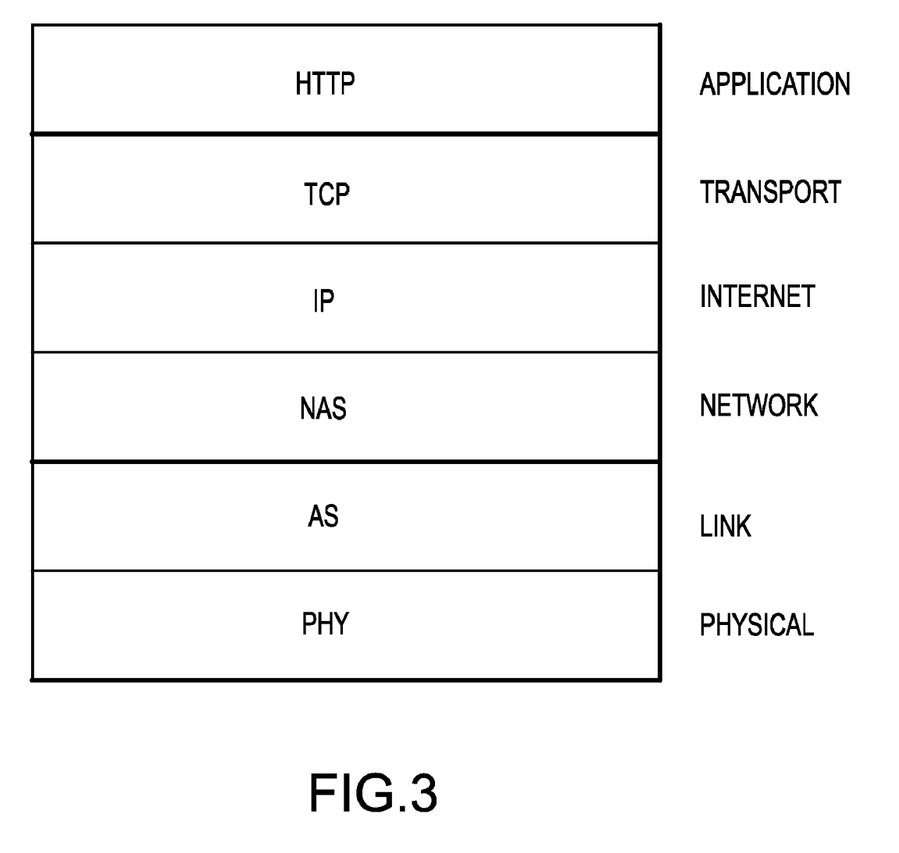
FIG. 3 illustrates an example wireless network protocol stack model for Web services over a connection-oriented transport session which includes a Non-Access Stratum (NAS) layer on top of an Access Stratum (AS) layer.

In one aspect, a wireless network comprising a core network (CN) and an access network (AN) may be modeled using a network protocol stack. FIG. 3 illustrates an example wireless network protocol stack model for Web services over a connection-oriented transport session which includes a Non-Access Stratum (NAS) layer on top of an Access Stratum (AS) layer. The wireless network protocol stack includes seven layers: application layer, transport layer, Internet layer, network layer, link layer and physical layer. The NAS is the network layer which provides network services such as mobility management, connection management, session management, etc. between a core network (CN) and a user equipment (UE). The AS is the link layer which provides lower level services for the NAS such as radio resource control, radio link control, media access control, physical layer services, etc.

Figure 4:
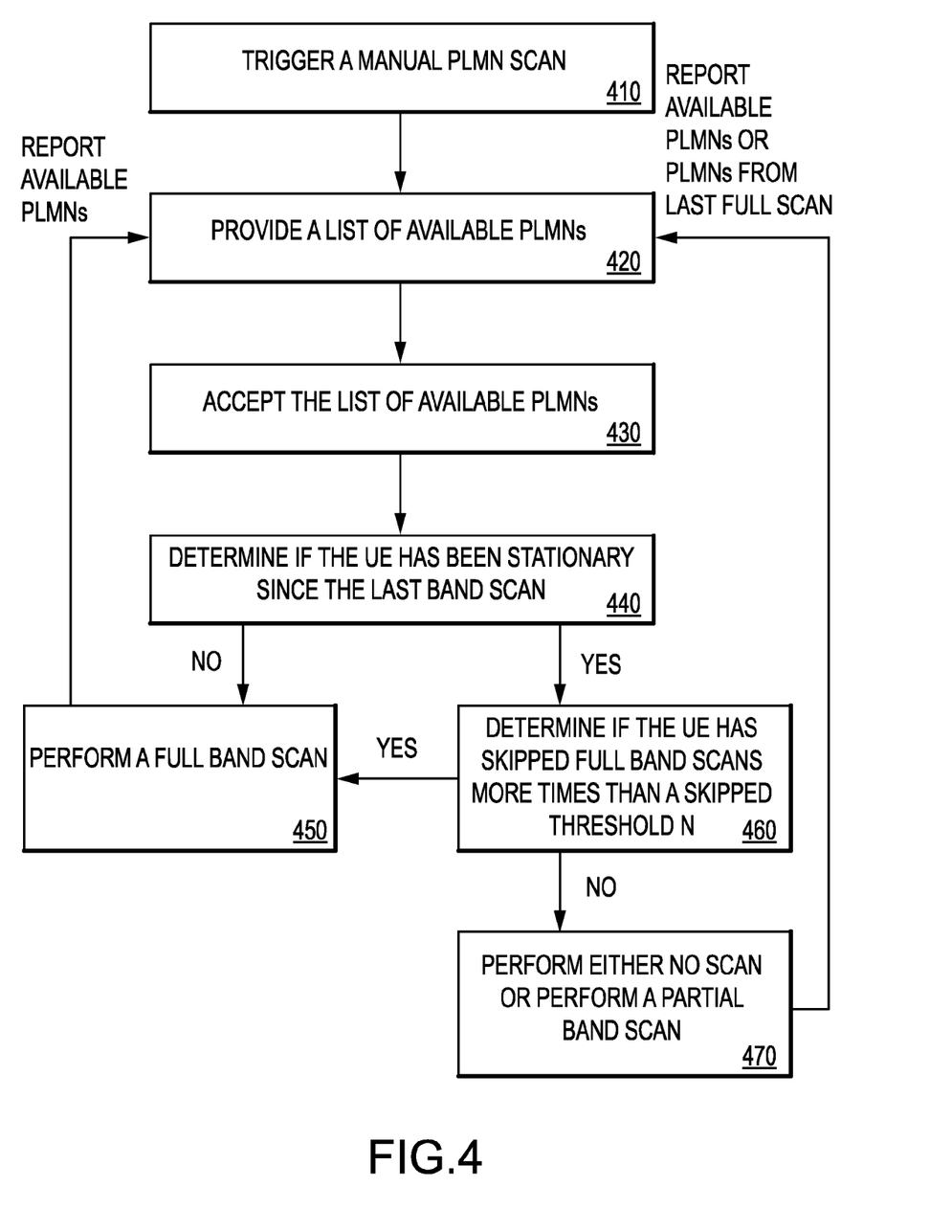
FIG. 4 illustrates an example flow process for manual public land mobile network (PLMN) scan.

In a manual PLMN scan, the user chooses a scan to find a suitable wireless network. FIG. 4 illustrates an example flow process for manual PLMN scan. In block 410, trigger a manual PLMN scan. In one example, the user triggers the scan. Following block 410, in block 420, provide a list of available PLMNs. In one example, the Non-Access Stratum (NAS) layer provides the list of available PLMNs. In block 430, accept the list of available PLMNs. In one example, the list of available PLMNs is accepted by the Access Stratum (AS) layer. Following block 430, in block 440, determine if the UE has been stationary since the last band scan. In one aspect, the last band scan is a full band scan. In one example, a motion sensor is employed to monitor movement of the UE. One skilled in the art would understand that many types of motion sensors, including but not limited to, infrared (IR) sensors, ultrasonic sensors, microwave sensors, accelerometers, etc. may be used without affecting the scope and spirit of the present disclosure.

If it is determined in block 440 that the UE has not been stationary since the last band scan, proceed to block 450 to perform a full band scan. In one aspect, following the full band scan, report the available PLMNs to the Non-Access Stratum (NAS) layer. If it is determined in block 440 that the UE has been stationary since the last band scan, proceed to block 460. In block 460, determine if the UE has skipped full band scans more times than a skipped threshold N. One skilled in the art would understand that the skipped threshold N can be set to any value determined, for example, by an operator of the user equipment. Also, one skilled in the art would understand that the value of the skipped threshold N may depend on one or more of the following factors, a particular application, operational constraints, design or user choice etc., without affecting the scope or spirit of the present disclosure.

If yes, that is, the UE has skipped full band scans more times than the skipped threshold N, proceed to block 450 to perform the full band scan. If no, that is, the UE has not skipped full band scans more times than the skipped threshold N, proceed to block 470. In block 470, perform either no scan or perform a partial band scan. The choice of performing either no scan or a partial band scan may be based on different factors. In one example, if there is at least one acquisition database entry, a partial band scan is performed. On the other hand, if there is no acquisition database entry, no scan is performed. In another example, the UE chooses a partial scan if it has found at least one PLMN in the last scan. In one other example, battery life or preset protocols dictates the choice of either no scan or performing a partial scan. One skilled in the art would understand that the examples shown herein are not exclusive and that other factors may influence the choice of performing either no scan or a partial scan without affecting the scope or spirit of the present disclosure.

In one aspect, following block 470, report either the PLMNs from the last full band scan or report the available PLMNs found in the partial band scan to the Non-Access Stratum (NAS) layer.

In a higher priority PLMN scan scenario, the UE is outside its home network, for example in a roaming scenario where it is attached to another network (e.g., a visitor PLMN). In this network the UE is given a lower priority than other users belonging to the network. In one aspect, the UE scans for an available home network where it will receive a higher priority service. In one example, the UE will scan every 6 minutes.

Figure 5:
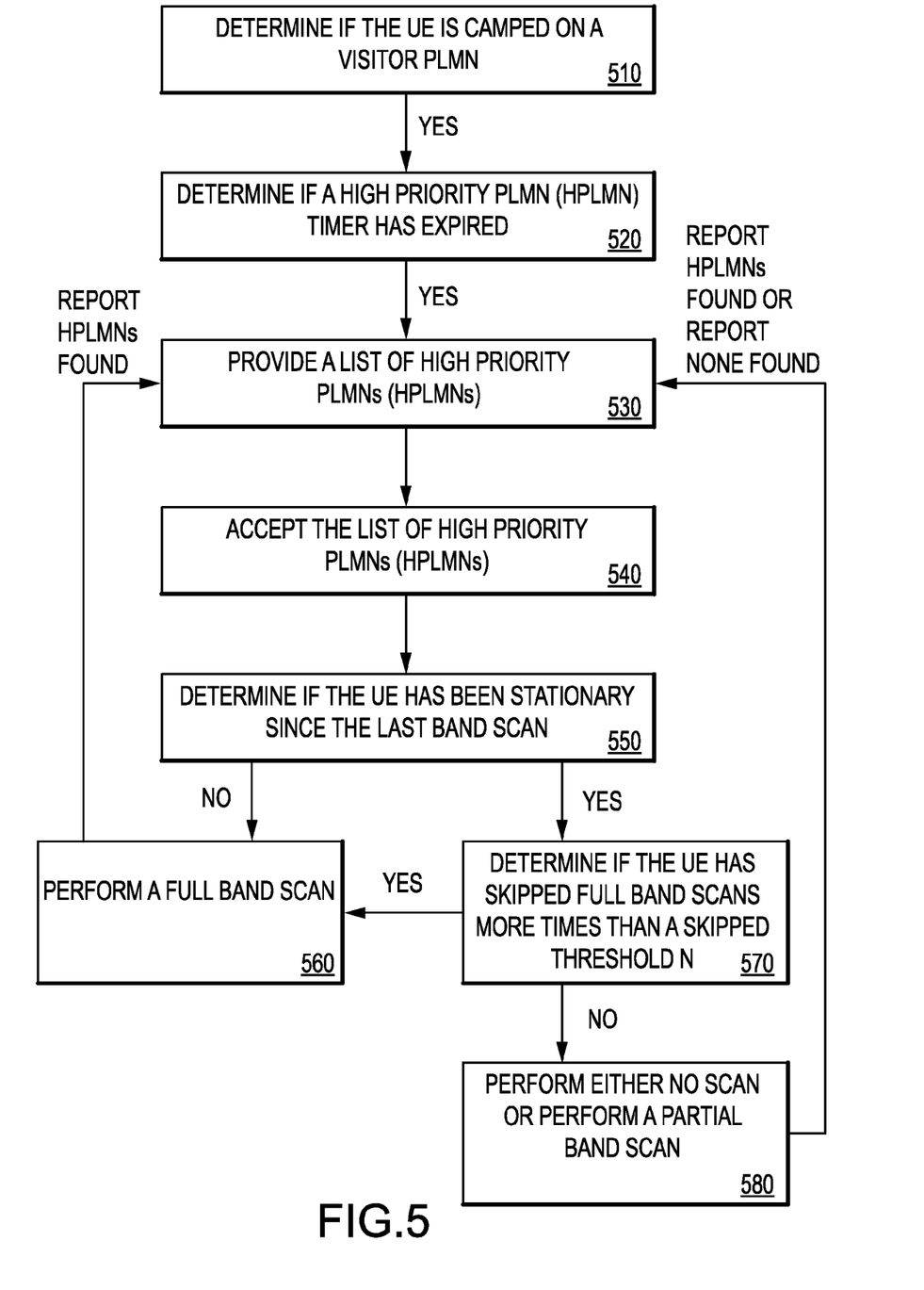
FIG. 5 illustrates an example flow process for a higher priority public land mobile network (HPLMN) scan.

FIG. 5 illustrates an example flow process for a higher priority PLMN scan. In block 510, determine if the UE is camped on a visitor PLMN. If the UE is not camped on a visitor PLMN, continue to monitor. Following block 510 in block 520, if the UE is camped on the visitor PLMN, determine if a high priority PLMN (HPLMN) timer has expired. In one example, the HPLMN timer is set when the UE first camps on the visitor PLMN. The duration of the HPLMN timer can be preset. One skilled in the art would understand that the duration of the HPLMN timer can be preset according to various factors, such as but not limited to a particular application, operational constraints, design or user choice, without affecting the scope and spirit of the present disclosure. If the HPLMN timer has not expired, continue to monitor. In block 530, provide a list of high priority PLMNs (HPLMNs) if the HPLMN timer has expired. In one example, the Non-Access Stratum (NAS) layer provides the list of high priority PLMNs (HPLMNs). In block 540, accept the list of high priority PLMNs (HPLMNs). In one example, the list of high priority PLMNs (HPLMNs) is accepted by the Access Stratum (AS) layer.

Following block 540, in block 550, determine if the UE has been stationary since the last band scan. In one aspect, the last band scan is a full band scan. In one example, a motion sensor is employed to monitor movement of the UE. One skilled in the art would understand that many types of motion sensors, including but not limited to, infrared (IR) sensors, ultrasonic sensors, microwave sensors, accelerometers, etc. may be used without affecting the scope and spirit of the present disclosure. If it is determined in block 550 that the UE has not been stationary since the last band scan, proceed to block 560 to perform a full band scan. In one aspect, following the full band scan, report the high priority PLMNs (HPLMNs) found to the Non-Access Stratum (NAS) layer.

If it is determined in block 550 that the UE has been stationary since the last band scan, proceed to block 570. In block 570, determine if the UE has skipped full band scans more times than a skipped threshold N. If yes, that is, the UE has skipped full band scans more times than the skipped threshold N, proceed to block 560 to perform the full band scan. If no, that is, the UE has not skipped full band scans more times than the skipped threshold N, proceed to block 580. In block 580, perform either no scan or perform a partial band scan. In one aspect, following block 580, report either no high priority PLMNs (HPLMNs) found or report the HPLMNs found to the Non-Access Stratum (NAS) layer.

Figure 6:
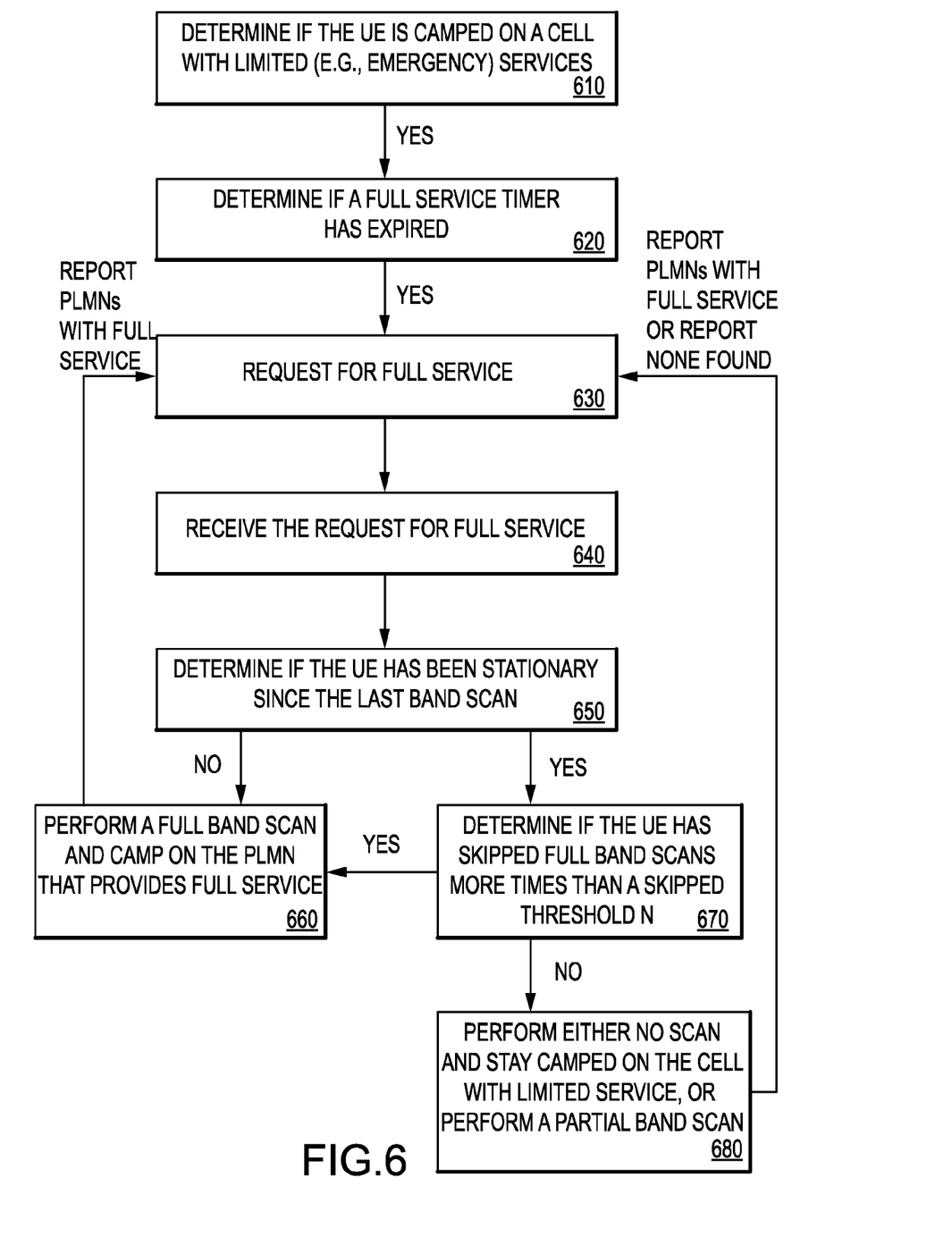
FIG. 6 illustrates an example flow process for a periodic full service scan.

In a periodic full service search scan, the UE is outside its home network, but is given emergency services with another network. In this case, the UE will scan periodically for a full service network that it can use. FIG. 6 illustrates an example flow process for a periodic full service scan. In block 610, determine if the UE is camped on a cell with limited (e.g., emergency) services to the UE. If the UE is not camped on a cell with limited (e.g., emergency) services, continue to monitor. Following block 610 in block 620, if the UE is camped on the cell with limited (e.g., emergency) services, determine if a full service timer has expired. In one example, the full service timer is set when the UE first camps on the cell. The duration of the full service timer can be preset. One skilled in the art would understand that the duration of the full service timer can be preset according to various factors, such as but not limited to a particular application, operational constraints, design or user choice, without affecting the scope and spirit of the present disclosure. If the full service timer has not expired, continue to monitor.

In block 630, if the full service timer has expired, request for full service. In one aspect, the request is made by the Non-Access Stratum (NAS) layer. In one example, the request is for full service on one of a registered PLMN (RPLMN), a high priority PLMN (HPLMN) or a preferred PLMN. Following block 630, in block 640, receive the request for full service. In one example, the Access Stratum (AS) layer receives the request.

Following block 640, in block 650, determine if the UE has been stationary since the last band scan. In one aspect, the last band scan is a full band scan. In one example, a motion sensor is employed to monitor movement of the UE. One skilled in the art would understand that many types of motion sensors, including but not limited to, infrared (IR) sensors, ultrasonic sensors, microwave sensors, accelerometers, etc. may be used without affecting the scope and spirit of the present disclosure. If it is determined in block 650 that the UE has not been stationary since the last band scan, proceed to block 660 to perform a full band scan and camp on the PLMN that provides full service. In one aspect, also report the PLMN that provides the full service to the Non-Access Stratum (NAS) layer. If it is determined in block 650 that the UE has been stationary since the last band scan, proceed to block 670. In block 670, determine if the UE has skipped full band scans more times than a skipped threshold N. If yes, that is, the UE has skipped full band scans more times than the skipped threshold N, proceed to block 660.

If no, that is, the UE has not skipped full band scans more times than the skipped threshold N, proceed to block 680. In block 680, perform either no scan and stay camped on the cell with limited service, or perform a partial band scan. In one aspect, following block 680, report either no PLMNs found or report the PLMNs found that provide full service to the Non-Access Stratum (NAS) layer.

Figure 7:
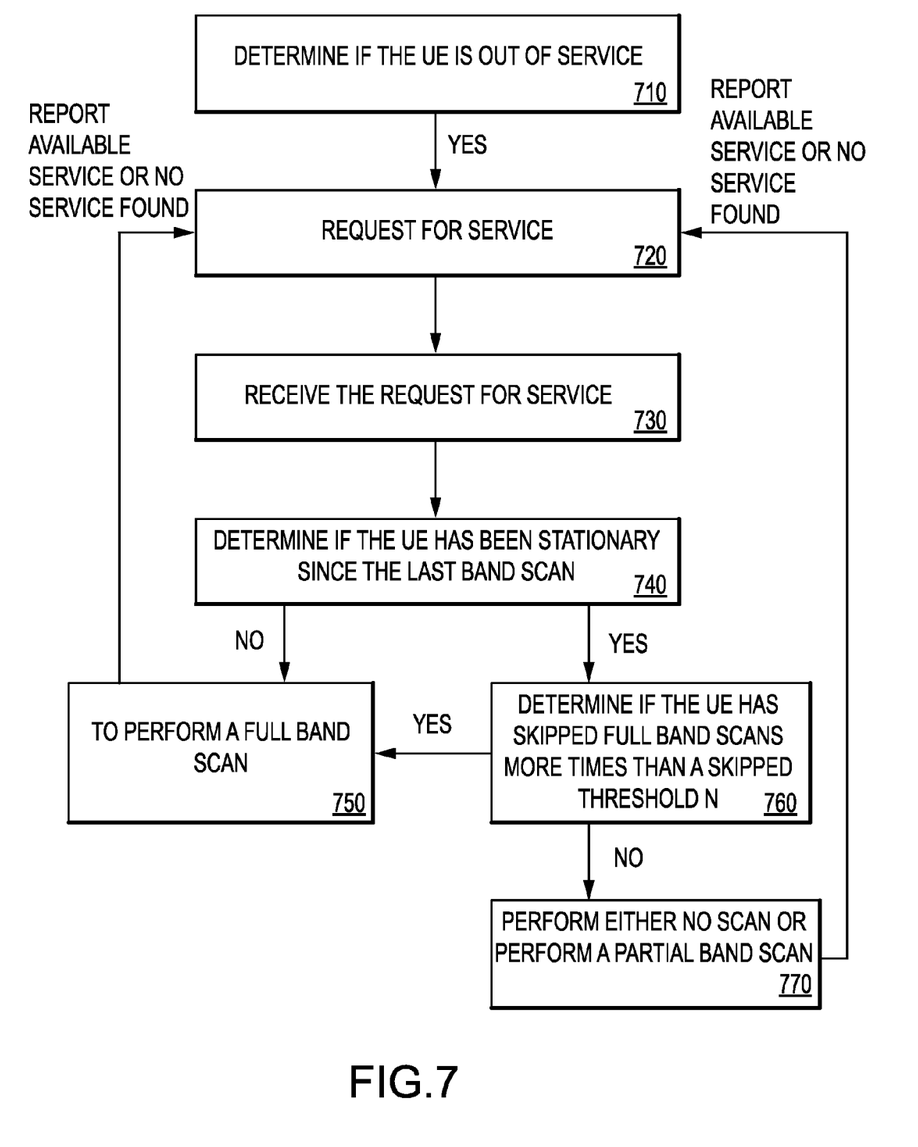
FIG. 7 illustrates an example flow process for an out of service scan.

FIG. 7 illustrates an example flow process for an out of service scan. In block 710, determine if the UE is out of service. If the UE is not out of service, continue to monitor. In block 720, if the UE is out of service, request for service. In one aspect, the request is for full service. In another aspect, the request is for limited (e.g., emergency) service. In one example, the request is made by the Non-Access Stratum (NAS) layer. In block 730, receive the request for service. In one example, the Access Stratum (AS) layer receives the request.

In block 740, determine if the UE has been stationary since the last band scan. In one aspect, the last band scan is a full band scan. In one example, a motion sensor is employed to monitor movement of the UE. One skilled in the art would understand that many types of motion sensors, including but not limited to, infrared (IR) sensors, ultrasonic sensors, microwave sensors, accelerometers, etc. may be used without affecting the scope and spirit of the present disclosure. If it is determined in block 740 that the UE has not been stationary since the last band scan, proceed to block 750 to perform a full band scan. In the full band scan, the UE is searching for a PLMN that can provide full service to the UE. In one aspect, also report either no service or report the presence of any service to the Non-Access Stratum (NAS) layer.

If it is determined in block 740 that the UE has been stationary since the last band scan, proceed to block 760. In block 760, determine if the UE has skipped full band scans more times than a skipped threshold N. If yes, that is, the UE has skipped full band scans more times than the skipped threshold N, proceed to block 750. If no, that is, the ULE has not skipped full band scans more times than the skipped threshold N, proceed to block 770. In block 770, perform either no scan or perform a partial band scan. In one aspect, following block 770, report either no service or report the presence of any service to the Non-Access Stratum (NAS) layer.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
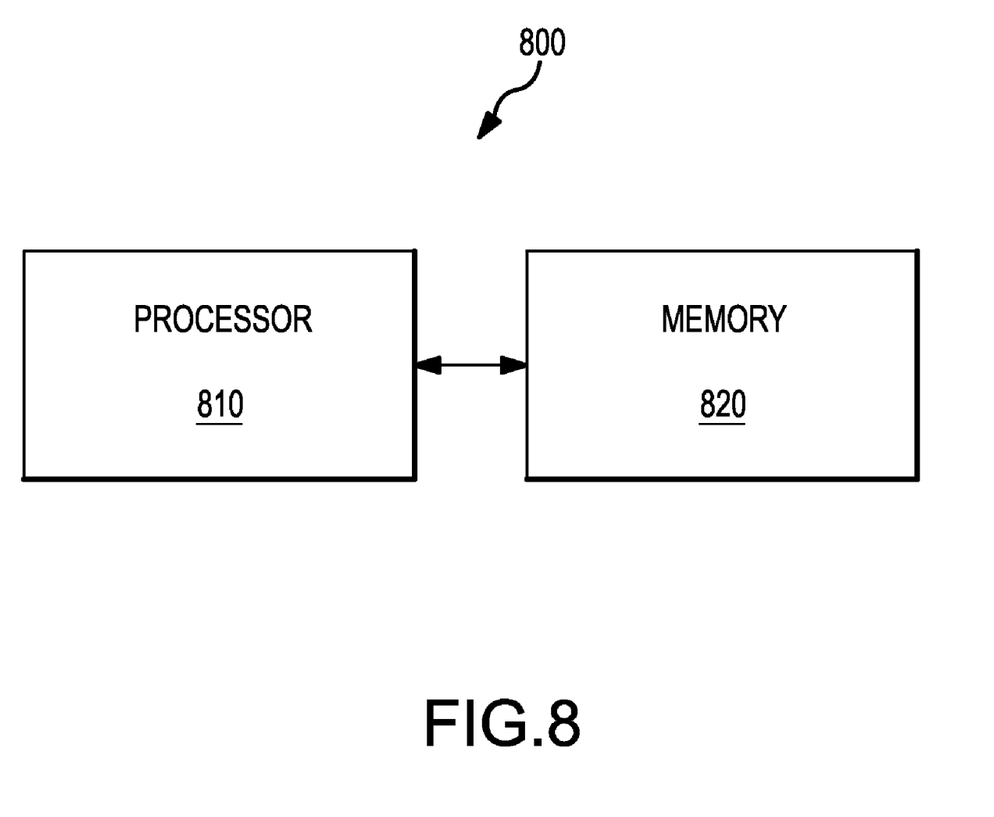
FIG. 8 illustrates an example of a device comprising a processor in communication with a memory for determining whether to perform full band scans by using motion sensor data.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for determining whether to perform full band scans by using motion sensor data. In one example, the device 800 is used to implement one or more of the algorithms illustrated in FIGS. 3-7. In one aspect, the memory 820 is located within the processor 810. In another aspect, the memory 820 is external to the processor 810. In one aspect, the processor includes circuitry for implementing or performing the various flow diagrams, logical blocks and/or modules described herein. In one aspect, the processor 810 comprises one or more modules configured to provide different aspects for determining whether to perform full band scans by using motion sensor data as described in FIGS. 3-7, wherein each module comprises hardware, firmware, software, or any combination thereof. In this manner, each module is representative of a means for performing the functions described in each of the blocks of FIGS. 3-7 respectively.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for determining whether to perform a full band scan by using motion sensor data, comprising:
   determining from the motion sensor data, if user equipment (UE) has been stationary since the full band scan was last performed;
   determining, when the UE has been stationary, if the UE has skipped full band scans more times than a skipped threshold;
   performing a full band scan with the UE, if the UE has skipped full band scans more times than the skipped threshold; and
   performing a partial band scan, or no scan, if the UE has not skipped full band scans more times than the skipped threshold.

2. The method of claim 1, wherein the partial band scan is a scan over only channels most frequently used by the UE.

3. The method of claim 1, further comprising reporting to a Non-Access Stratum (NAS) layer at least one available public land mobile network (PLMN) found during either the full band scan or the partial band scan.

4. The method of claim 3,. wherein the at least one PLMN is a high priority public land mobile network (HPLMN).

5. The method of claim 4, further comprising determining if the UE is camped on a visitor public land mobile network (visitor PLMN).

6. The method of claim 5, further comprising determining if a high priority public land mobile network timer (HPLMN timer) has expired.

7. The method of clam 1, further comprising camping on a public land mobile network (PLMN) that provides full service to the UE.

8. The method of claim 7, further comprising reporting the PLMN that provides full service to a Non-Access Stratum (NAS) layer.

9. The method of claim 1, further comprising staying camped on a cell that provides limited service.

10. The method of claim 9, further comprising reporting no public land mobile network (PLMN) providing full service found to a Non-Access Stratum (NAS) layer.

11. The method of claim 1, further comprising reporting at least one public land mobile network (PLMN) providing full service found to a Non-Access Stratum (NAS) layer.

12. The method of claim 1, further comprising determining if the UE is camped on a cell that provides limited services to the UE.

13. The method of claim 12, further comprising determining if a full service timer has expired.

14. The method of claim 1, further comprising reporting no service found.

15. The method of claim 14, wherein the reporting is to a Non-Access Stratum (NAS) layer.

16. The method of claim 15, further comprising determining if the UE is out of service.

17. User equipment (UE), comprising:
   a processor; and
   a memory comprising program code executable by the processor for performing the following:
      determining if the UE has been stationary since a full band scan was last performed;
      determining, when the UE has been stationary, if the UE has skipped full band scans more times than a skipped threshold;
      performing a full band scan with the UE, if the UE has skipped full band scans more times than the skipped threshold; and
      performing a partial band scan, or no scan, if the UE has not skipped full band scans more times than the skipped threshold.

18. The user equipment of claim 17, wherein the memory further comprises program code for reporting to a Non-Access Stratum (NAS) layer at least one available public land mobile network (PLMN) found during either the full band scan or the partial band scan.

19. The user equipment of claim 17, wherein the memory further comprises program code for camping on a public land mobile network (PLMN) that provides full service to the UE.

20. The user equipment of claim 19, wherein the memory further comprises program code for reporting the public land mobile network (PLMN) that provides full service to a Non-Access Stratum (NAS) layer.

21. The user equipment of claim 17, wherein the memory further comprises program code for staying camped on a cell that provides limited service.

22. The user equipment of claim 21, wherein the memory further comprises program code for reporting no public land mobile network (PLMN) providing full service found to a Non-Access Stratum (NAS) layer.

23. The user equipment of claim 17, wherein the memory further comprises program code for determining if the UE is camped on a visitor public land mobile network (visitor PLMN).

24. The user equipment of claim 17, wherein the memory further comprises program code for determining if the UE is camped on a cell that provides limited services to the UE.

25. The user equipment of claim 17, wherein the memory further comprises program code for determining if the UE is out of service.

26. A non-transient computer-readable medium having a computer program comprising instructions, which when executed by at least one processor, operates to determine whether to perform a full band scan by using motion sensor data, the computer program comprising:
- instructions for determining if user equipment (UE) has been stationary since the full band scan was last performed;
- instructions for determining, when the UE has been stationary, if the UE has skipped full band scans more times than a skipped threshold; and
- instructions for performing a full band scan with the UE, if the UE has skipped full band scans more times than the skipped threshold; and
- instructions for performing a partial band scan, or no scan, if the UE has not skipped full band scans more times than the skipped threshold.

27. User equipment (UE), comprising:
- means for determining if the UE has been stationary since the full band scan was last performed;
- means for determining, when the UE has been stationary, if the UE has skipped full band scans more times than a skipped threshold;
- means for performing a full band scan if the UE has skipped full band scans more times than the skipped threshold; and
- means for performing, if the UE has not skipped full band scans more times than the skipped threshold, a partial band scan or no scan.

* * * * *